(No Model.) 2 Sheets—Sheet 1.
R. M. SHAFFER.
METHOD OF AND APPARATUS FOR PRODUCING LETTERS OR CHARACTERS IN BREAD.
No. 527,027. Patented Oct. 2, 1894.
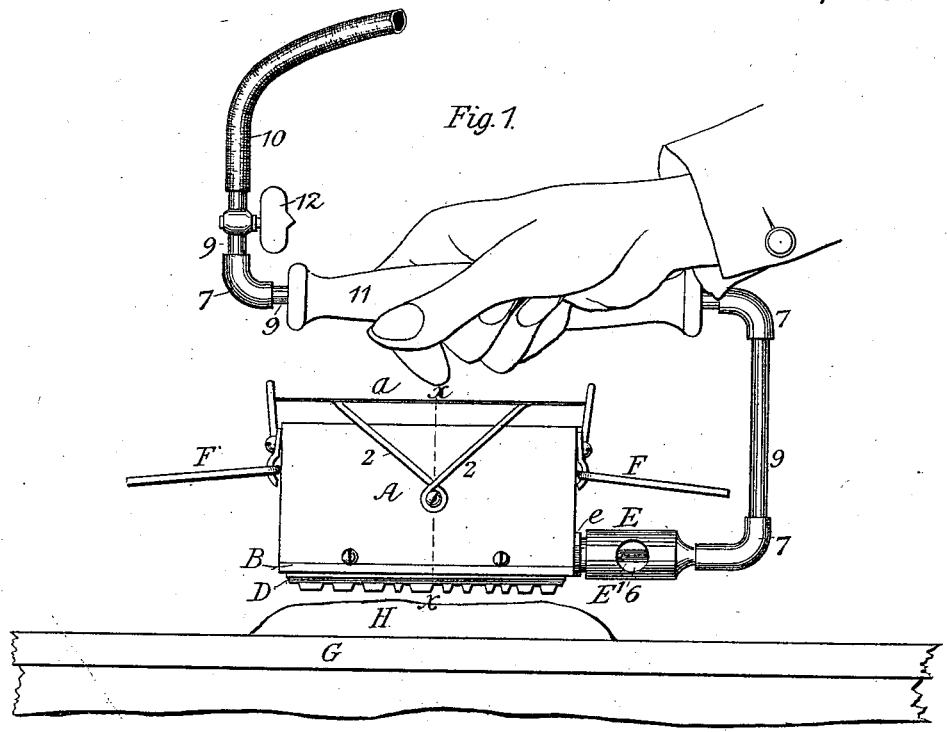
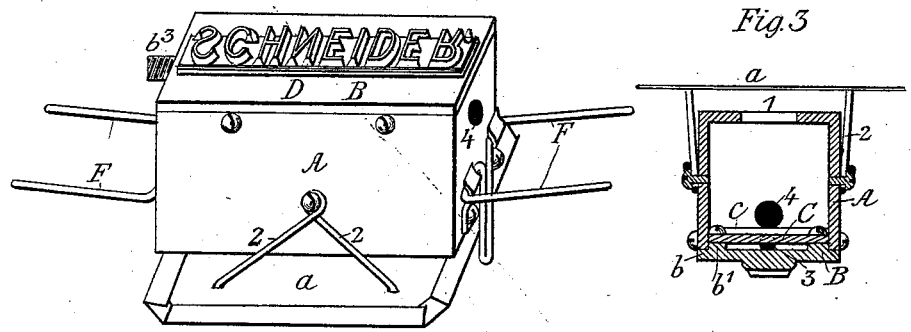
Witnesses
David W. Gould.
G. P. Strunn
Inventor
Richard M. Shaffer,
By Wm Hunter Myers,
Attorney (No Model.) 2 Sheets—Sheet 2.
R. M. SHAFFER.
METHOD OF AND APPARATUS FOR PRODUCING LETTERS OR CHARACTERS IN BREAD.
No. 527,027. Patented Oct. 2, 1894.
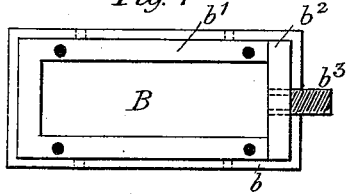
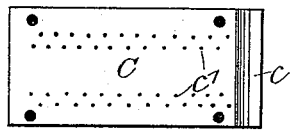
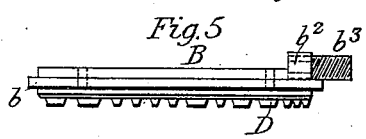
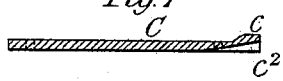
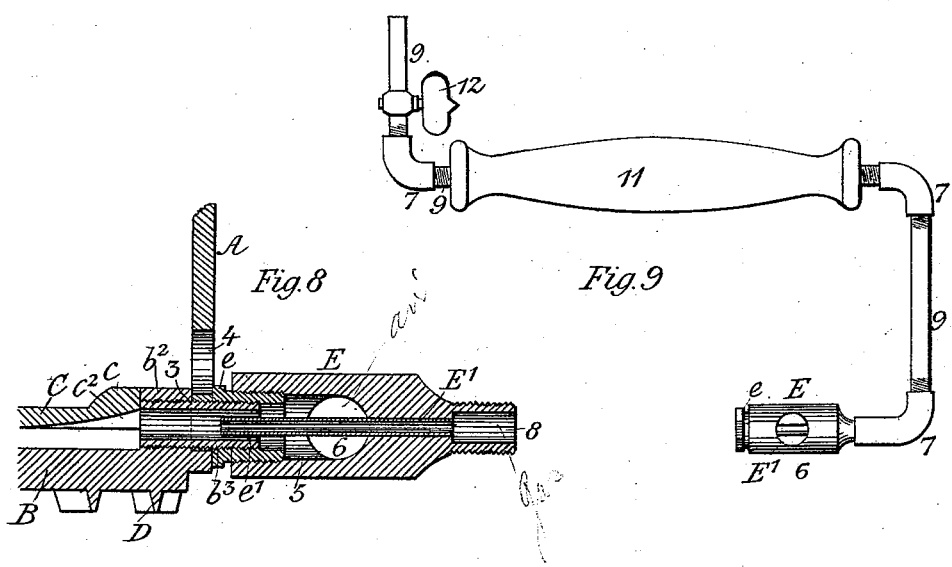
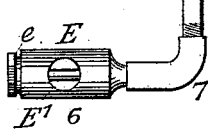
Witnesses
David W. Gould.
G. P. Strain
Inventor
Richard M. Shaffer,
By Wm. Hunter Myers
Attorney
THE NORRIS PETERS CO., PHOTO-LITHO., WASHINGTON, D. C.

UNITED STATES PATENT OFFICE.

RICHARD M. SHAFFER, OF BALTIMORE, MARYLAND.

METHOD OF AND APPARATUS FOR PRODUCING LETTERS OR CHARACTERS IN BREAD.

SPECIFICATION forming part of Letters Patent No. 527,027, dated October 2, 1894.

Application filed June 11, 1894. Serial No. 514,192. (No model.)

*To all whom it may concern:*

Be it known that I, RICHARD M. SHAFFER, a citizen of the United States, residing at Baltimore, in the State of Maryland, have invented certain new and useful Improvements in Methods of and Apparatus for Producing Letters or Characters in Bread, of which the following is a specification, reference being had therein to the accompanying drawings.

My invention relates to a method of and apparatus for producing letters or characters in bread.

The purpose of the invention is to enable a baker to turn out bread with his own name or any desired characters imprinted therein; the accomplishment of which consists in impressing said letters or characters in the blocks of dough by means of a die heated to a degree sufficient to sear the surfaces of the impressed letters or characters, whereby as the dough rises in the act of baking the obliteration of said letters or characters thereby is prevented.

My invention also consists in a novel apparatus well adapted for carrying out the above-described method.

Figure 1 of the drawings is a side elevation of my apparatus, showing the manner in which it is employed to stamp blocks of dough. Fig. 2 is a perspective under side view of the burner-box provided with a burner and die. Fig. 3 is a cross-section taken on the line $x\,x$, Fig. 1. Fig. 4 is a plan view of the burner with the burner-plate removed. Fig. 5 is a side view of the same. Fig. 6 is a plan view of the burner-plate. Fig. 7 is a longitudinal central section of the same. Fig. 8 is an enlarged vertical central sectional view of the air-mixer and so much of the burner-box, burner, and die as is necessary to show its connection therewith. Fig. 9 is a side elevation of the gas-delivery having the air-mixer connected therewith.

Referring to the drawings, A is the burner-box, which is rectangular in form, open at the bottom, and has a narrow rectangular opening 1 in the top, above which is a heat-shield $a$, supported by arms 2 removably secured to the sides of the box.

B is the burner, which, in addition to the burner-plate, hereinafter described, consists of a bottom-plate $b$, on which is a rectangular raised wall $b'$, one end portion of which is higher than the rest, in order to form a shoulder $b^2$. At one end the burner is provided with a screw-threaded nipple $b^3$, which communicates with the interior of the burner. This burner is secured in the bottom of the burner-box, the rectangular wall $b'$ fitting snugly therein, the nipple $b^3$ of the burner projecting through an opening 3 formed in one end of the burner-box. Draft-openings 4 are also formed in the ends of the burner-box.

C is the burner-plate, which is secured over the wall of the burner, it being provided at one end with a raised projection $c$, which abuts against the shoulder $b^2$ of the burner. This plate is perforated on each side of its longitudinal center, as at $c'$; and in its under side there is formed a central groove $c^2$, for a purpose hereinafter described.

To the under side of the burner is secured any suitable die D, the letters or characters of which are formed in relief. Before the gas is admitted to the burner for heating the die it passes through an air-mixer, comprising a cylindrical metal body E, having a large bore 5 in one end and lateral openings 6 communicating therewith, the other end of the body E being reduced in size to fit into a pipe-elbow 7 and having a bore 8, with which latter a small tube E', extending longitudinally through the body E, communicates. In the bore 5 of the mixer is inserted a reducer $e$, adapted to screw onto the nipple $b^3$ of the burner, the bore of the reducer being large enough to leave an annular space $e'$ around the central tube E'.

Hinged to the ends of the burner-box are legs F, formed of wire, and adapted to be turned down in a position to support the apparatus above the top of the table when not in use.

Gas is admitted to the burner from any suitable source of supply through a flexible tube 10, pipes 9, and elbows 7, that portion of the pipe horizontally above the burner-box being covered by a wooden handle 11. For convenience in regulating the flow of gas to the burner I have placed a stop-cock 12 in the pipe near the handle.

G represents a portion of a table, and H a block of dough lying thereon.

The operation of my apparatus is as follows: Gas being admitted to the burner through the flexible tube, the pipes, the mixer-tube, and the burner-nipple, air will enter the mixer through the openings 6, and, passing through the annular space $e'$ in the nipple, will meet the ingoing gas at the end of the mixer-tube and combine therewith, thus supplying oxygen to the gas, and thereby giving it a greater heating capacity than it would otherwise have. As the gas enters the burner under pressure it is directed by the groove $c^2$ in the burner-plate toward the longitudinal center of said plate, when, on expansion, it will make its exit through the various perforations in the burner-plate in an even manner. When the gas is ignited a draft sufficient to maintain a steady and regular flame will be set up by the air entering the box through the draft-openings 4. The heat thus developed will, by the conductivity of the burner, be transmitted to the die. When the die has become sufficiently heated the operator takes hold of the handle 11 and lightly places the die on a block of dough, when the surfaces of the letters or characters impressed in the dough will become seared and hardened, which will prevent the obliteration of said letters or characters by the rising of the dough while in the oven being baked.

Having thus described my invention, what I claim as new, and desire to secure by Letters Patent, is—

1. The herein-described method of producing letters or characters in bread, which consists in impressing said letters or characters in the blocks of dough by means of a die heated to a degree sufficient to sear the surfaces of the impressed letters or characters, whereby as the dough rises in the act of baking said letters or characters are caused to remain intact.

2. In an apparatus of the class above described, the combination, with a burner-box open on its lower side and having suitable draft-openings, of a burner located in and closing said open side of the box, the burner-plate having a longitudinal groove in its under side and perforated on each side of said groove, means for admitting gas to the interior of the burner, and a die secured on the outer side of the burner and adapted to be heated by the gas burning above the burner-plate.

3. In an apparatus of the class above described, the combination, with a burner-box open on its lower side and having suitable draft-openings, of a burner located in and closing said open side of the box and provided with a projecting nipple, an air-mixer secured to said nipple, gas-pipe connected with the mixer, a handle on said pipe, and a flexible tube leading from a gas-supply and connected with the gas-pipe.

In testimony whereof I affix my signature in presence of two witnesses.

RICHARD M. SHAFFER.

Witnesses:
WM. HUNTER MYERS,
CHAS. W. BLACKWOOD.